US010820525B2

(12) United States Patent
Kraus (10) Patent No.: US 10,820,525 B2
(45) Date of Patent: Nov. 3, 2020

(54) AGRICULTURAL BALER INCLUDING CROP PACKAGE BANDING SYSTEM AND METHOD

(71) Applicant: Deere & Company, Moline, IL (US)

(72) Inventor: Timothy J. Kraus, Blakesburg, IA (US)

(73) Assignee: DEERE & COMPANY, Moline, IL (US)

(*) Notice: Subject to any disclaimer, the term of this patent is extended or adjusted under 35 U.S.C. 154(b) by 205 days.

(21) Appl. No.: 16/031,498

(22) Filed: Jul. 10, 2018

(65) Prior Publication Data

US 2020/0015424 A1 Jan. 16, 2020

(51) Int. Cl.
*A01F 15/02* (2006.01)
*B65B 13/04* (2006.01)
(Continued)

(52) U.S. Cl.
CPC ........ *A01F 15/0715* (2013.01); *A01F 15/005* (2013.01); *A01F 15/02* (2013.01);
(Continued)

(58) Field of Classification Search
CPC ....... B65B 13/04; B65B 13/06; B65B 27/125; A01F 15/005; A01F 15/02; A01F 15/04; A01F 15/046; A01F 15/07; A01F 15/071; A01F 15/0715; A01F 15/0875; A01F 15/0883; A01F 15/14; A01F 15/141;
(Continued)

(56) References Cited

U.S. PATENT DOCUMENTS 3,195,445 A 7/1965 Meisler
4,177,723 A 12/1979 Buchele et al.
(Continued)

FOREIGN PATENT DOCUMENTS

DE 10131165 A1 2/2003
EP 0803183 A1 10/1997
(Continued)

OTHER PUBLICATIONS

European Patent Office Extended Search Report for Application No. 19184175.8 dated Dec. 13, 2019 (7 pages).
(Continued)

*Primary Examiner* — Jimmy T Nguyen
(74) *Attorney, Agent, or Firm* — Michael Best & Friedrich LLP (57) ABSTRACT

A banding system for an agricultural baler is configured to move a banding element around a crop package to band the crop package. The banding system includes a support member having a support surface configured to support the crop package. The support member includes a channel defined by an opening in the support surface. The channel is further defined by a first surface opposite a second surface and a third surface extending between the first and second surfaces. The first surface is at least partially defined by an angled surface angled relative to the second surface. The angled surface includes an apex positioned away from the opening. The banding system also includes a bander unit configured to move the banding element within the channel to band the crop package.

20 Claims, 4 Drawing Sheets

(51) Int. Cl.
*A01F 15/07* (2006.01)
*A01F 15/00* (2006.01)
*B65B 13/06* (2006.01)
*B65B 27/12* (2006.01)
*A01F 15/18* (2006.01)

(52) U.S. Cl.
CPC .............. *A01F 15/07* (2013.01); *B65B 13/04* (2013.01); *B65B 13/06* (2013.01); *B65B 27/125* (2013.01); *A01F 2015/183* (2013.01)

(58) Field of Classification Search
CPC ...... A01F 2015/0795; A01F 2015/0775; A01F 2015/183; A01D 85/005; A01D 2085/007; A01D 2085/008
See application file for complete search history.

(56) References Cited

U.S. PATENT DOCUMENTS

| | | | |
|---|---|---|---|
| 4,697,510 A * | 10/1987 | Cranston, III | B65B 13/06 100/14 |
| 6,425,235 B1 * | 7/2002 | Spaniol | A01D 85/005 56/474 |
| 6,499,525 B1 * | 12/2002 | Lai | B65B 13/06 100/26 |
| 6,769,353 B1 | 8/2004 | Smith et al. | |
| 6,840,023 B2 | 1/2005 | Roth et al. | |
| 6,901,719 B2 | 6/2005 | Viaud | |
| 7,127,985 B2 | 10/2006 | Standlee | |
| 7,237,478 B1 * | 7/2007 | Gosis | B65B 13/06 100/26 |
| 8,230,663 B2 | 7/2012 | Viaud | |
| 8,833,247 B2 | 9/2014 | Olander | |
| 9,205,938 B2 * | 12/2015 | Stein | B65B 13/06 |
| 9,351,444 B2 | 5/2016 | Keller | |
| 9,622,420 B2 * | 4/2017 | Kraus | B65G 47/967 |
| 2012/0210888 A1 | 8/2012 | Olander | |
| 2016/0235008 A1 | 8/2016 | Keller | |

FOREIGN PATENT DOCUMENTS

| | | |
|---|---|---|
| EP | 2628591 A2 | 8/2013 |
| EP | 3461321 A1 | 4/2019 |
| EP | 3461322 A1 | 4/2019 |
| WO | 2015153300 A1 | 10/2015 |

OTHER PUBLICATIONS

YouTube, "Round Bale Press," <https://www.youtube.com/watch?v=6wCJFnrXBmA> webpage publically available at least as early as Mar. 31, 2014.

European Search Report issued in counterpart European Patent Application No. 19184183.2 dated Dec. 13, 2019 (07 pages).

* cited by examiner

AGRICULTURAL BALER INCLUDING CROP PACKAGE BANDING SYSTEM AND METHOD

BACKGROUND

The present disclosure relates to agricultural balers, and more particularly to a banding system of an agricultural baler that wraps at least one banding element around an agricultural crop package.

SUMMARY

In one aspect, an agricultural baler includes a frame, a gate moveably coupled to the frame between an open position and a closed position, and a formation chamber positioned between the frame and the gate. The formation chamber is configured to form a crop package. The agricultural baler also includes a banding system having a support member with a support surface configured to support the crop package. The support member includes a channel defined by an opening in the support surface. The channel is further defined by a first surface opposite a second surface and a third surface extending between the first and second surfaces. The first surface includes a protrusion extending toward the second surface such that a first width of the channel defined by the opening is equal to or greater than a second width of the channel defined between the protrusion and the second surface. The banding system also includes a bander unit configured to move a banding element within the channel to band the crop package.

In another aspect, a banding system for an agricultural baler is configured to move a banding element around a crop package to band the crop package. The banding system includes a support member having a support surface configured to support the crop package. The support member includes a channel defined by an opening in the support surface. The channel is further defined by a first surface opposite a second surface and a third surface extending between the first and second surfaces. A distance between the first and second surfaces varies from the third surface to the opening. The banding system also includes a bander unit configured to move the banding element within the channel to band the crop package.

In yet another aspect, a banding system for an agricultural baler is configured to move a banding element around a crop package to band the crop package. The banding system includes a support member having a support surface configured to support the crop package. The support member includes a channel defined by an opening in the support surface. The channel is further defined by a first surface opposite a second surface and a third surface extending between the first and second surfaces. The first surface is at least partially defined by an angled surface angled relative to the second surface. The angled surface includes an apex positioned away from the opening. The banding system also includes a bander unit configured to move the banding element within the channel to band the crop package.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Terms of degree, such as "substantially" or "approximately" are understood by those of ordinary skill to refer to reasonable ranges outside of the given value, for example, general tolerances associated with manufacturing, assembly, and use of the described embodiments.

Figure 1:
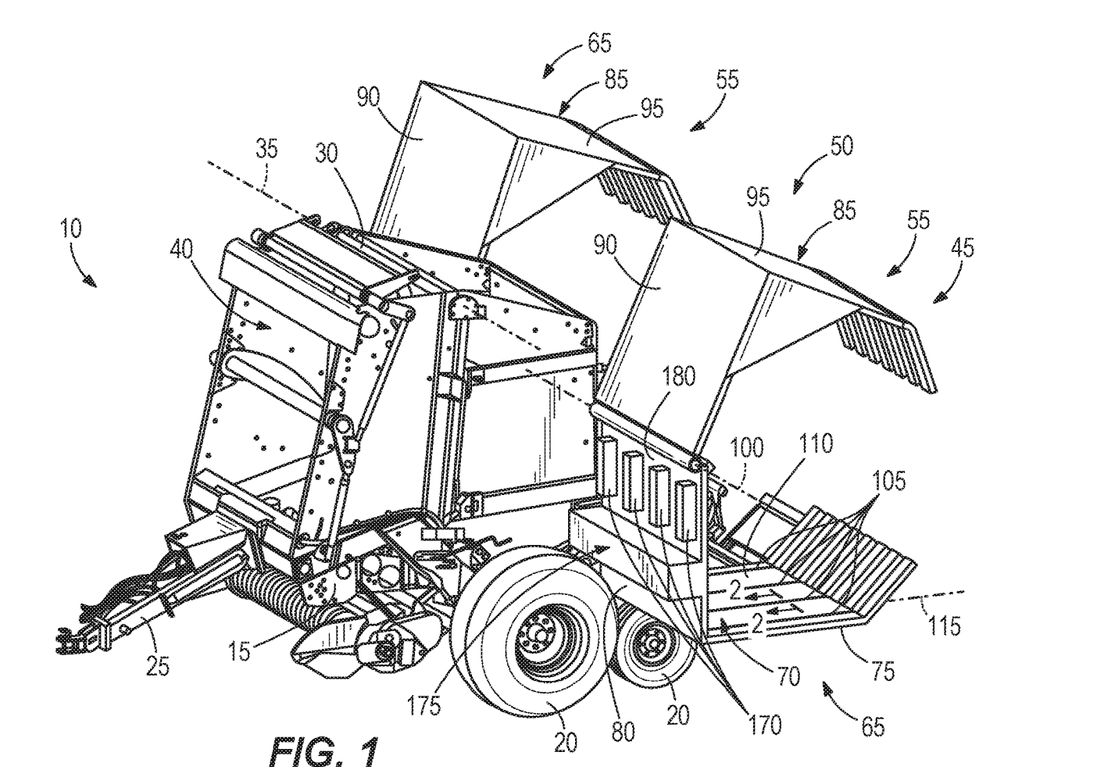
FIG. 1 is a front perspective view of an agricultural baler including a crop package reconfiguration and banding system according to an embodiment of the disclosure.
Figure 3:
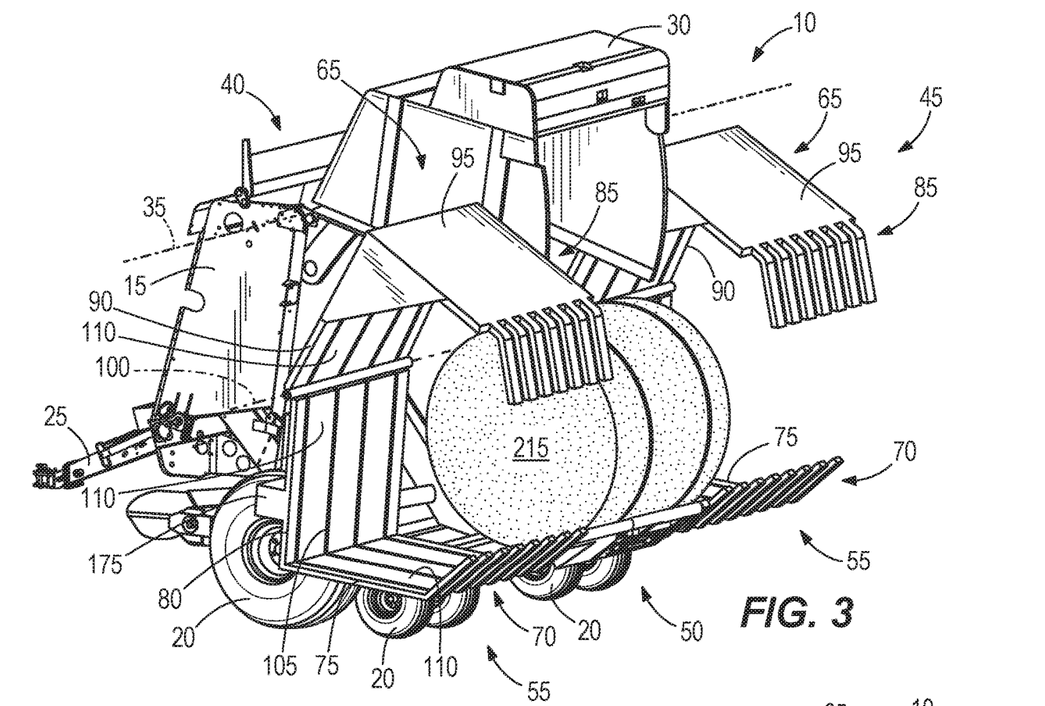
FIG. 3 is a rear perspective view of the agricultural baler of FIG. 1 including a cylindrical-shaped crop package supported on an accumulator of the agricultural baler.

FIG. 1 illustrates an agricultural baler 10 selectively coupled to a vehicle (e.g., tractor) for the vehicle to move the agricultural baler 10 through an agricultural field. The baler 10 includes a chassis 15, wheels 20 rotatably coupled to the chassis 15 to support the baler 10 above the agricultural field, a tongue 25 coupled to a front portion of the chassis 15 allowing the baler 10 to be towed behind the vehicle, and a gate 30 pivotably coupled to the chassis 15 about a gate axis 35 between a closed position (FIG. 1) and an open position (FIG. 3). A formation chamber 40 is defined between the chassis 15 and the gate 30—when the gate 30 is in the closed position—and is operable to form a crop package as the baler 10 moves through the agricultural field. In the illustrated embodiment, the baler 10 is a "round" baler that forms generally cylindrical-shaped crop packages within the formation chamber 40, however, in other embodiments, the baler 10 can be a "square" baler that forms generally cuboid-shaped (e.g., cube, rectangular prism, etc.) crop packages within the formation chamber 40. In further embodiments, the gate 30 can be slidably coupled to the chassis 15 between the closed position and the open position.

Figure 4:
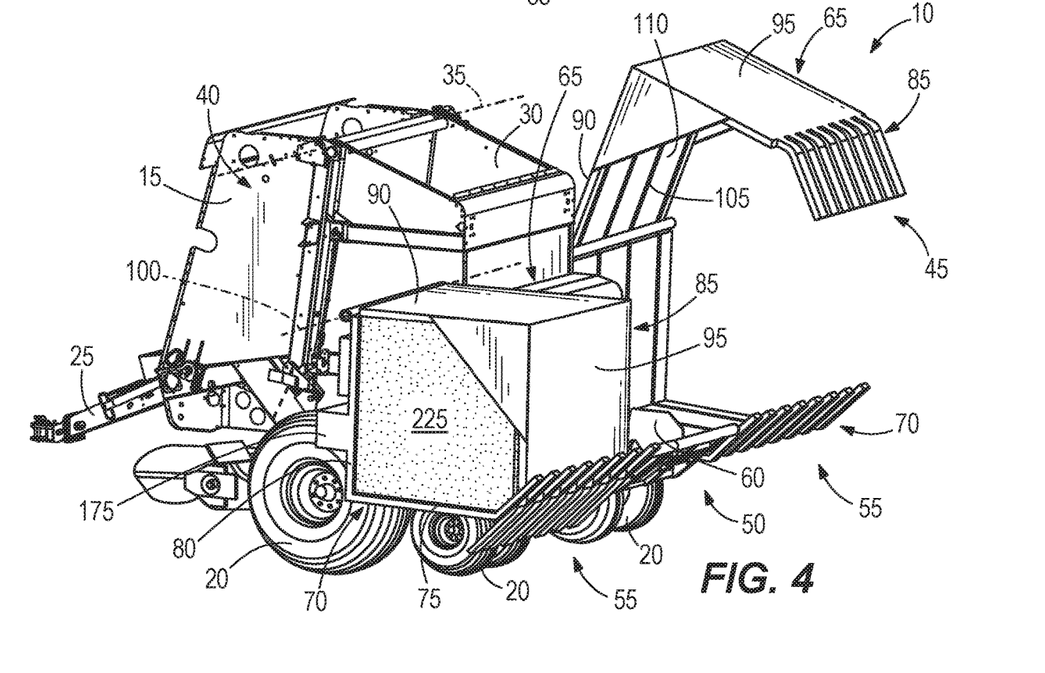
FIG. 4 is a rear perspective view of the agricultural baler of FIG. 1 including the cylindrical-shaped crop package reconfigured as a cuboid-shaped crop package by the reconfiguration and banding system.

The illustrated baler 10 also includes an accumulator 45 positioned downstream of the formation chamber 40 and operable to support one or more crop packages that are discharged sequentially from the formation chamber 40—when the gate 30 is in the open position. The accumulator 45 includes a middle section 50 positioned between two side sections 55 with each section 50, 55 operable to support one crop package above the agricultural field. A pushing mechanism 60 (e.g., a pushing plate; FIG. 4) is slidable within the middle section 50 to push a crop package supported on the middle section 50 to one of the two side sections 55. In the illustrated embodiment, each side section 55 is substantially the same such that features of one side section 55 are applicable to the other side section 55. As such, only one of the side sections 55 will be discussed in detail below.

The illustrated side section 55 defines a reconfiguration and banding system 65 operable to change the shape of a crop package discharged from the formation chamber 40 and to band or secure the crop package into the new shape. The illustrated reconfiguration and banding system 65 includes a first support frame 70 having a bottom support plate 75 and a first side support plate 80 oriented substantially perpendicular to the bottom support plate 75 such that the first support frame 70 is generally L-shaped in cross section (e.g., within a cross sectional plane perpendicular to the gate axis 35 or a rotational axis of the wheels 20). The reconfiguration and banding system 65 also includes a second support frame 85 having a top support plate 90 and a second side support plate 95 oriented substantially perpendicular to the top support plate 90 such that the second support frame 85 is also generally L-shaped in cross section similar to the first support frame 70. Accordingly, the first and second support frames 70, 85 collectively define four support plates. In other embodiments, first support frame 70 can include more or less than two support plates and/or the second support frame 85 can include more or less than two support plates with the total sum of the support plates being four. The illustrated first and second support frames 70, 85 are pivotably coupled together about a pivot axis 100 that is oriented substantially parallel with the gate axis 35 or the rotational axis of the wheels 20. In other embodiments, the second support frame 85 can be slidably coupled to the first support frame 70. In further embodiments, the reconfiguration and banding system 65 can define the middle section 50 of the accumulator 45 with the two side sections 55 operable to simply support the crop packages above the agricultural field. In other words, the baler 10 can include one reconfiguration and banding system 65 rather than two.

Each support plate or member 75, 80, 90, 95 includes a plurality of channels 105 formed into an abutting surface 110 of each support plate 75, 80, 90, 95 such that each channel 105 is centered on a plane that is substantially perpendicular to the gate axis 35 or the rotational axis of the wheels 20. Stated another way, each channel 105 defines a longitudinal axis 115 oriented substantially perpendicular to the gate axis 35 or the rotational axis of the wheels 20 (only one longitudinal axis 115 is illustrated in FIG. 1). The abutting surfaces 110 are configured to contact the crop package when the crop package is received by the reconfiguration and banding system 65. In the illustrated embodiment, each support plate 75, 80, 90, 95 includes four channels 105, but in other embodiments, the support plates 75, 80, 90, 95 can include more or less than four channels 105. In the illustrated embodiment, each channel 105 of the support plates 75, 80, 90, 95 is substantially the same such that features of one channel 105 are applicable to the other channels 105. As such, only one of the channels 105 with respect to the bottom support plate 75 will be discussed in detail below. In other embodiments, the channels 105 can be differently configured.

Figure 2:
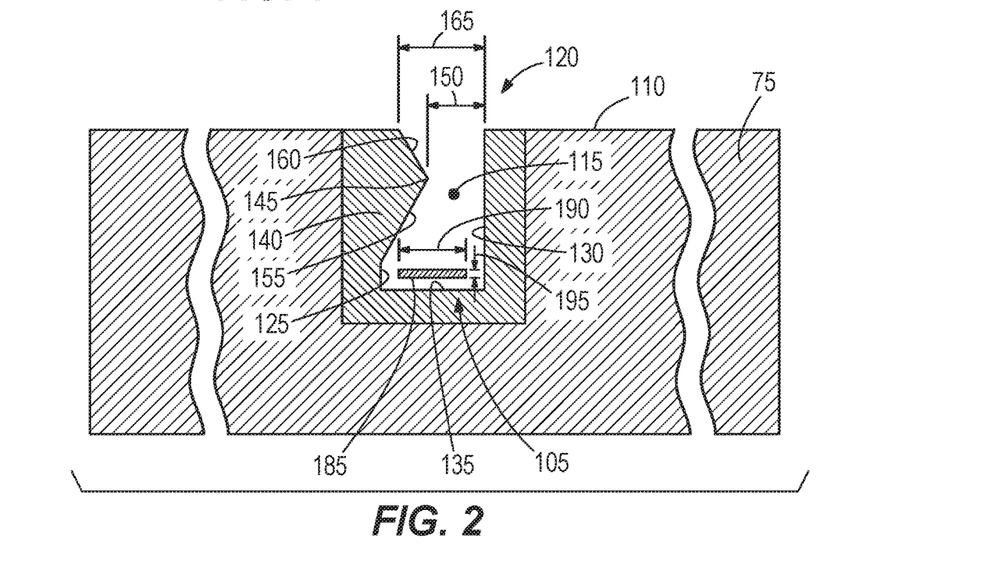
FIG. 2 is a cross sectional view of a portion of the reconfiguration and banding system of FIG. 1 taken along line 2-2.

As best shown in FIG. 2, the channel 105 is defined by an opening 120 in the abutting or support surface 110 of the bottom support plate 75. The illustrated channel 105 is also defined by a first surface 125 positioned opposite a second surface 130 and a third surface 135 extending between the first and second surfaces 125, 130 (e.g., the third surface 135 is positioned opposite the opening 120). In other embodiments, the third surface 135 can be omitted causing the channel 105 to extend completely through the bottom support plate 75. In the illustrated embodiment, the second surface 130 is oriented substantially perpendicular to the support surface 110 of the bottom support plate 75, and the third surface 135 is oriented substantially perpendicular to the second surface 130. In other embodiments, the second surface 130 can be obliquely oriented relative to the support surface 110, and/or the third surface 135 can be obliquely oriented relative to the second surface 130.

The illustrated first surface 125 includes a protrusion 140 extending toward the second surface 130 with a tip or apex 145 of the protrusion 140 positioned closest to the second surface 130. In particular, the protrusion 140 is formed as a fixed portion of the first surface 125 and configured to vary a distance between the first and second surfaces 125, 130 from the third surface 135 to the opening 120. A first width 150 of the channel 105 is defined between the apex 145 and the second surface 130. The illustrated protrusion 140 defines a first protrusion surface 155 extending toward the second surface 130 to the apex 145. The first protrusion surface 155 is obliquely angled relative to the support surface 110 and the second surface 130. The illustrated first protrusion surface 155 is substantially linear, but in other embodiments, the first protrusion surface 155 can be non-linear (e.g., curved, etc.). The protrusion 140 also defines a second protrusion surface 160 extending away from the second surface 130 and the apex 145 toward the support surface 110. The second protrusion surface 160 is obliquely angled relative to the support surface 110, the first protrusion surface 155, and the second surface 130. The illustrated second protrusion surface 160 is substantially linear, but in other embodiments, the second protrusion surface 160 can be non-linear (e.g., curved, etc.). In further embodiments, the second protrusion surface 160 can be oriented substantially parallel to the second surface 130 or substantially perpendicular to the second surface 130. The illustrated second protrusion surface 160 connects with the support surface 110 such that a portion of the second protrusion surface 160 and the second surface 130 define the opening 120 of the bottom support plate 75. A second width 165 of the channel 105 defined by the opening 120 is greater than the first width 150 of the channel 105. In other words, the protrusion 140 is configured such that a distance between the first surface 125 and the second surface 130 decreases in a direction from the third surface 135 to the apex 145 and increases in a direction from the apex 145 to the opening 120. Within other embodiments where the second protrusion surface 160 is oriented substantially parallel to the second surface 130, the second width 165 of the channel 105 can be substantially equal to the first width 150 of the channel 105. In the illustrated embodiment, the apex 145 is positioned away from the opening 120 and closer to the opening 120 than to the third surface 135 in a direction from the third surface 135 to the opening 120. In other embodiments, the apex 145 can be positioned substantially in the middle of the opening 120 and the third surface 135 or positioned closer to the third surface 135 than the opening 120.

With reference back to FIG. 1, each reconfiguration and banding system 65 also includes a plurality of bander units 170 and a compartment 175 coupled to an outer surface 180 of the first side support plate 80. In other embodiments, the plurality of bander units 170 and/or the compartment 175 can be coupled to any portion of the first support frame 70 and/or the second support frame 85. The compartment 175 is configured to hold one or more rolls of a banding element 185 (FIG. 2) with each bander unit 170 coupled to the compartment 175 to move one banding element 185 through one channel 105. In one embodiment, each bander unit 170 can be at least one pinch roller that pulls a banding element 185 from the compartment 175 and pushes the banding element 185 through four aligned channels 105 of the first and second support frames 70, 85. For example, each bander unit 170 can push a banding element 185 through a portion of the channel 105 formed in the first side support plate 80, through an aligning channel 105 formed within the top support plate 90, through an aligning channel 105 formed within the second side support plate 95, through an aligning channel 105 formed in the bottom support plate 75, and through the remaining portion of the channel 105 formed in the first side support plate 80. In other embodiments, each bander unit 170 can push a banding element 185 in the other direction (e.g., from the bottom support plate 75, to the second side support plate 95, to the top support plate 90, and to the first side support plate 80). In further embodiments, each bander unit 170 can include a puller mechanism that is driven and moveable through four aligned channels 105 (e.g., the puller mechanism is positioned between the apex 145 and the third surface 135 to move through the channels 105) and operable to grip an end of the banding element 185 and pull the banding element 185 through the four aligned channels 105 of the first and second support frames 70, 85.

With reference to FIG. 2, each banding element 185 is rectangular in cross section (in a plane perpendicular to the longitudinal axis 115 of a corresponding channel 105) to define a width 190 and a height 195 with the width 190 being greater than the height 195. In the illustrated embodiment, the height 195 of each banding element 185 is less than the first width 150 of the channel 105, the width 190 of each banding element 185 is greater than the first width 150 of the channel 105, and the width 190 of each banding element 185 is less than the second width 165 of the channel 105. In one embodiment, the width 190 of each banding element 185 is between about 0.5 inches and about 0.75 inches, and the height 195 of each banding element 185 is between about 0.01 inches and about 0.2 inches. In other embodiments, each banding element 185 can define a different cross sectional geometry (e.g., circular, ovular, square, triangular, etc.), and/or define different cross sectional dimensions. In some embodiments, each banding element 185 can be made of a flexible metallic material, a flexible plastic material, etc.

Figure 7:
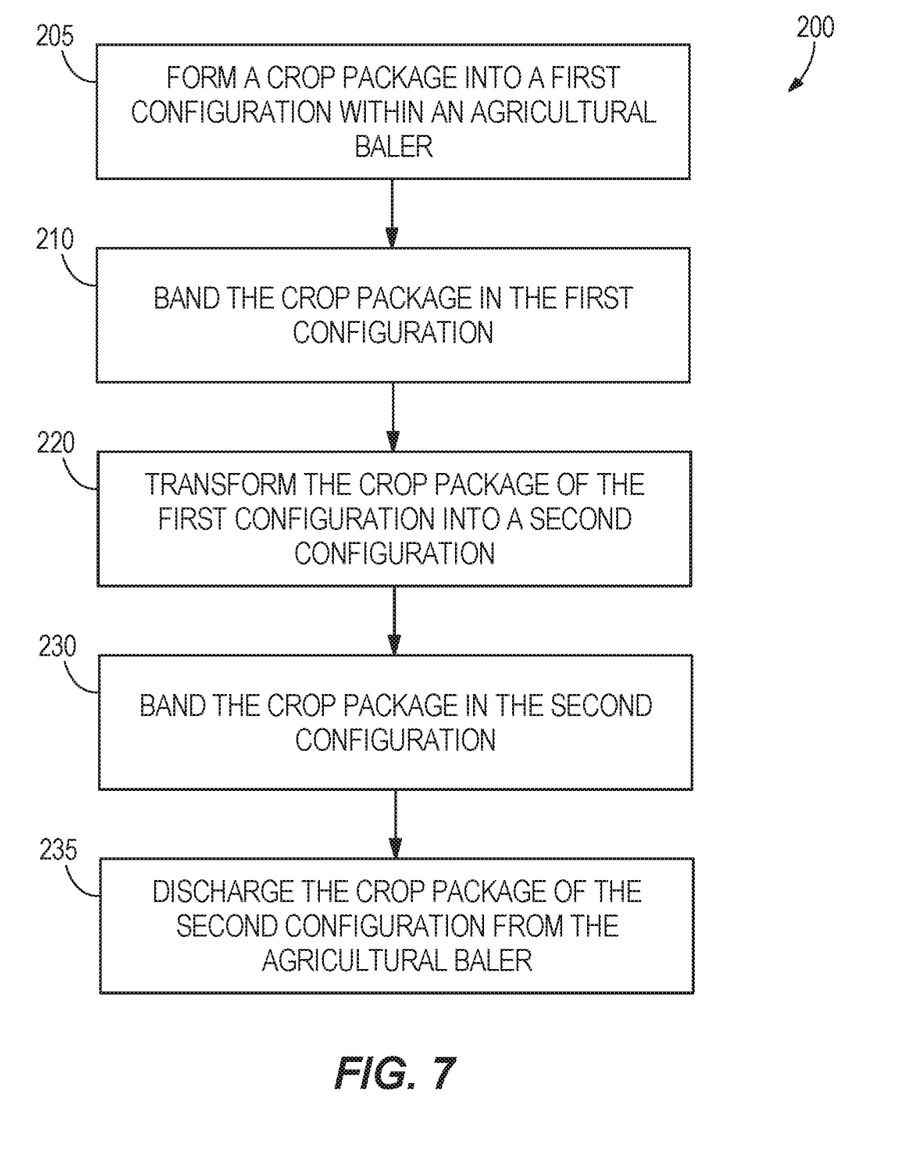
FIG. 7 illustrates a method of preparing a crop package to be discharged from the agricultural baler of FIG. 1.

FIG. 7 illustrates a method 200 of preparing a crop package to be discharged from the baler 10 as shown in FIGS. 3-6. The illustrated baler 10 is operable to form a crop package into a first configuration (e.g., a cylindrical-shaped crop package) within the formation chamber 40 (step 205; FIG. 7) as the baler 10 moves across the agricultural field. Once the baler 10 completely forms the crop package within the formation chamber 40, the baler 10 bands the crop package in the first configuration (step 210; FIG. 7) to secure the crop package in a cylindrical shape before the crop package is discharged from the formation chamber 40. For example, the baler 10 can use similar banding elements 185 of the reconfiguration and banding system 65 to band the cylindrical-shaped crop package 215 within the formation chamber 40. As discussed in more detail below, the banding operation of the baler 10 is temporary in order to transfer the crop package from the formation chamber 40 to the reconfiguration and banding system 65.

With reference to FIG. 3, the gate 30 is moved to the open position allowing the cylindrical-shaped crop package 215 to be discharged from the formation chamber 40 and onto the middle section 50 of the accumulator 45. The cylindrical-shaped crop package 215 can then be moved to either the two side sections 55 by actuating the pushing mechanism 60 to move the cylindrical-shaped crop package 215 toward one of the two side sections 55.

The method 200 also includes a step 220 (FIG. 7) of transforming the cylindrical-shaped crop package 215 into a second configuration (e.g., a cuboid-shaped crop package 225; FIG. 4) by the reconfiguration and banding system 65. In particular, the cylindrical-shaped crop package 215 is captured between the first and second support frames 70, 85 as the first and second support frames 70, 85 move relative to each other about the pivot axis 100 to reconfigure and compress the cylindrical-shaped crop package 215 into the cuboid-shaped crop package 225. As a result, sides of the cuboid-shaped crop package 225 are in direct contact with the abutting surfaces 110 of the support plates 75, 80, 90, 95 to hold the shape of the cuboid-shaped crop package 225 between the first and second support frames 70, 85. As discussed above, the banding operation of the baler 10 (step 210) is temporary, and once the crop package is captured between the first and second support frames 70, 85, the banding elements that hold the crop package in the cylindrical shape can be removed from the crop package and collected to be reused by the baler 10 or disposed of.

The illustrated reconfiguration and banding system 65 is also operable to band the cuboid-shaped crop package 225 (step 230; FIG. 7). The bander units 170 are actuated (e.g., the pinch rollers are rotated in a first direction) to push the banding elements 185 around the cuboid-shaped crop package 225. The flexibility of the banding elements 185 allows the banding elements 185 to easily transition between adjacent aligned channels 105. Once the bander units 170 push the banding elements 185 one revolution around the cuboid-shaped crop package 225, the bander units 170 tighten the banding elements 185 onto the cuboid-shaped crop package 225 (e.g., the pinch rollers are rotated in a second direction). As movement of the banding elements 185 within their corresponding channels 105 are substantially the same when the banding elements 185 are tightened onto the cuboid-shaped crop package 225, movement of one banding element 185 with one channel 105 will be discussed in detail below.

Figure 5:
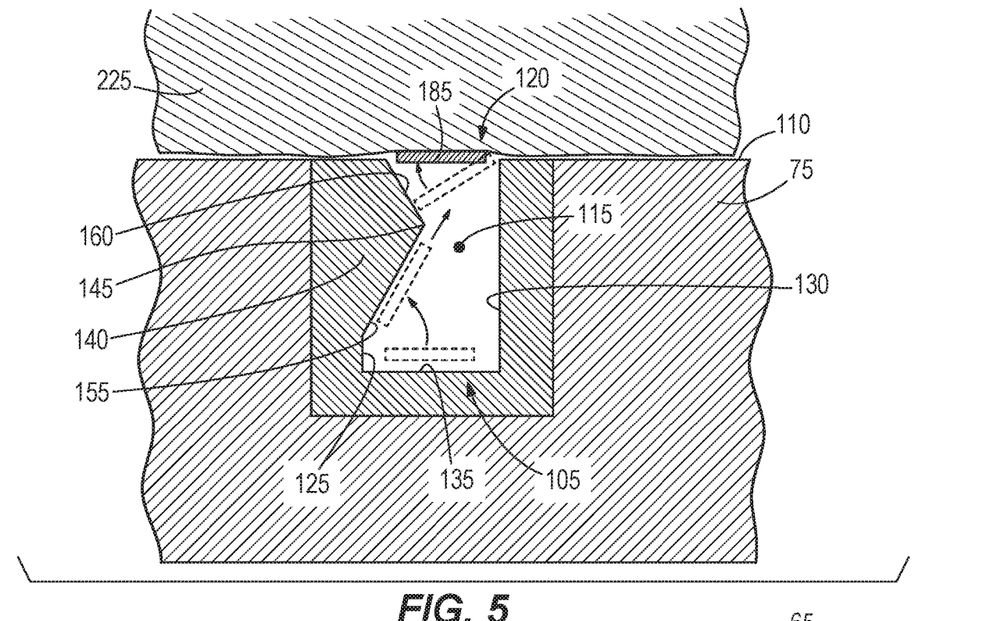
FIG. 5 is a cross sectional view of the portion of the reconfiguration and banding system of FIG. 1 taken along line 2-2 with the cuboid-shaped crop package supported on the reconfiguration and banding system.
Figure 6:
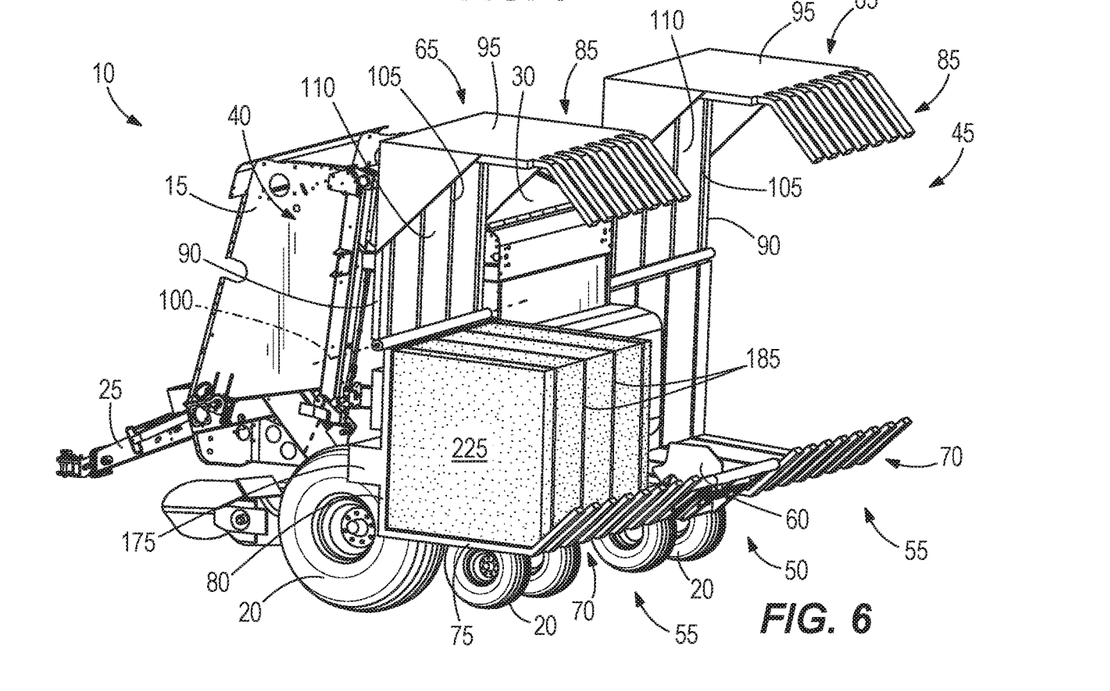
FIG. 6 is a rear perspective view of the agricultural baler of FIG. 1 including the cuboid-shaped crop package of FIG. 4 banded by the reconfiguration and banding system.

FIG. 5 generally illustrates a sequence of movements of the banding element 185 within the channel 105. As the banding element 185 is tightened onto the cuboid-shaped crop package 225, the banding element 185 moves toward the opening 120 and comes into contact with the first protrusion surface 155 causing the banding element 185 to pivot and slide along the first protrusion surface 155 toward the apex 145. Once the banding element 185 clears the apex 145, the banding element can then pivot again to an orientation substantially parallel to the support surface 110. With further tightening of the banding element 185 onto the cuboid-shaped crop package 225, the banding element 185 exits the channel 105.

In the illustrated embodiment, as the reconfiguration and banding system 65 compresses the cylindrical-shaped crop package 215 into the cuboid-shaped crop package 225, material of the crop package extending over the channels 105 will have a tendency to move into the channels 105. The illustrated protrusions 140 are operable to inhibit the material of the crop package from moving past the apexes 145 toward the third surfaces 135 to avoid interference of the material with the banding elements 185 being pushed through the channels 105. As such, the bander units 170 can easily push the banding elements 185 through the channels 105 and around the cuboid-shaped crop package 225. The illustrated protrusions 140 are also operable to allow the banding elements 185 to slide along the protrusion 140 toward the opening 120 and provides enough space once the banding elements 185 clear the apexes 145 for the banding elements 185 to pivot and exit the channels 105.

Once the banding elements 185 are tightened around the cuboid-shaped crop package 225 and exit their corresponding channels 105, ends of each banding element 185 are fastened together (e.g., by a clip, etc.) to secure the crop package in the cuboid shape. In addition, the second support frame 85 pivots away from the cuboid-shaped crop package 225 (FIG. 6) allowing the cuboid-shaped crop package 225 to be discharged from the baler 10 (step 235; FIG. 7). In one embodiment, the accumulator 45 can rotate relative to the chassis 15 of the baler 10 allowing the cuboid-shaped crop package 225 to move (e.g., slide, roll, etc.) off of the accumulator 45 and onto the agricultural field.

In the illustrated embodiment, the baler 10 includes two reconfiguration and banding systems 65 so that a first cylindrical-shaped crop package can be formed in the formation chamber 40, discharged onto the accumulator 45, moved to one of the side sections 55 by the pushing mechanism 60, reconfigured and compressed into a first cuboid-shaped crop package, and banded into the cuboid shape. While the first cylindrical-shaped crop package is being reconfigured and compressed into the first cuboid-shaped crop package and banded into the cuboid shape, the baler 10 can also form a second cylindrical-shaped crop package in the formation chamber 40 to be discharged onto the accumulator 45, moved to the other side section 55 by the pushing mechanism 60, reconfigured and compressed into a second cuboid-shaped crop package, and banded into the cuboid shape. As a result, the accumulator 45 can support two cuboid-shaped crop packages at a time before discharging the cuboid-shaped crop packages from the baler 10.

In the embodiment with one reconfiguration and banding system 65 located in the middle section 50 of the accumulator 45, the baler 10 is operable to form a first cylindrical-shaped crop package in the formation chamber 40 to be discharged to the reconfiguration and banding system 65 for the reconfiguration and banding system 65 to reconfigure and compress the first cylindrical-shaped crop package into a first cuboid-shaped crop package and to band the first cuboid-shaped crop package to then be moved to one of the two side sections 55 by the pushing mechanism 60. A similar process occurs when the baler 10 produces a second cylindrical-shaped crop package in the formation chamber 40 to be discharged to the reconfiguration and banding system 65 to be reconfigured and banded as a second cuboid-shaped crop package before being moved to the other side section 55.

In further embodiments, the baler 10 can form a first cuboid-shaped crop package within the formation chamber 40 and the reconfiguration and banding system 65 can compress the first cuboid-shaped crop package into a smaller, more dense second cuboid-shaped crop package.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. An agricultural baler comprising:
a frame;
a plurality of wheels rotatably coupled to the frame, the plurality of wheels configured to support the agricultural baler on a surface and allow for movement of the agricultural baler relative to the surface;
a gate moveably coupled to the frame between an open position and a closed position;
a formation chamber positioned between the frame and the gate, the formation chamber configured to form a crop package; and
a banding system including
a support member including a support surface configured to support the crop package, the support member including a channel defined by an opening in the support surface, the channel further defined by a first surface opposite a second surface and a third surface extending between the first and second surfaces, the first surface including a protrusion extending toward the second surface such that a first width of the channel defined by the opening is equal to or greater than a second width of the channel defined between the protrusion and the second surface, and
a bander unit configured to move a banding element within the channel to band the crop package.

2. The agricultural baler of claim 1, wherein a tip of the protrusion is located closer to the opening than to the third surface.

3. The agricultural baler of claim 2, wherein the protrusion is at least partially defined by a protrusion surface angled relative to the second surface, and wherein the protrusion surface is positioned between the tip of the protrusion and the third surface.

4. The agricultural baler of claim 3, wherein the protrusion is configured to block a portion of material from the crop package moving past the tip of the protrusion toward the third surface, and wherein the protrusion is configured to allow the banding element to slide along the protrusion surface past the tip of the protrusion toward the opening.

5. The agricultural baler of claim 1, wherein the protrusion is a fixed protrusion formed as a portion of the first surface, and wherein the protrusion is at least partially defined by a linear surface angled relative to the second surface.

6. The agricultural baler of claim 1, wherein the channel defines a longitudinal axis, and wherein the banding element is configured to extend within the channel along the longitudinal axis, and wherein the banding element defines a width greater than a height, and wherein the width and the height are oriented perpendicular to the longitudinal axis, and wherein the second width of the channel is greater than the height of the banding element and less than the width of the banding element.

7. The agricultural baler of claim 1, wherein the support member includes a plurality of spaced channels with each channel of the plurality of channels defined by an opening in the support surface, and wherein each channel of the plurality of channels is further defined by a first surface opposite a second surface and a third surface extending between the first and second surfaces, and wherein the first surface of each channel of the plurality of channels includes a protrusion extending toward the second surface of the corresponding channel, and wherein the banding system includes a plurality of bander units each associated with one channel of the plurality of channels.

8. The agricultural baler of claim 1, wherein the formation chamber is configured to form the crop package into a first configuration, and wherein the banding system is configured to receive the crop package in the first configuration and band the crop package into a second configuration.

9. The agricultural baler of claim 8, wherein the first configuration is a cylindrical-shaped crop package, and wherein the second configuration is a cuboid-shaped crop package.

10. A banding system for an agricultural baler, the banding system configured to move a banding element around a crop package to band the crop package, the banding system comprising:
  a support member including a support surface configured to support the crop package, the support member including a channel defined by an opening in the support surface, the channel further defined by a first surface opposite a second surface and a third surface extending between the first and second surfaces, the first surface including a first oblique surface relative to the support surface, a second oblique surface relative to the support surface, and an apex between the first and second oblique surfaces, wherein a distance measured parallel to the support surface between the first oblique surface and the second surfaces varies decreases in a direction toward the apex, wherein a distance measured parallel to the support surface between the second oblique surface and the second surface increases in the direction from the apex to the opening; and
  a bander unit configured to move the banding element within the channel to band the crop package.

11. The banding system of claim 10, wherein the first surface is positioned closest to the second surface at the apex, and wherein the apex is located closer to the opening than to the third surface.

12. The banding system of claim 11, wherein the angled surface is a first and second oblique surfaces are linear surfaces, wherein the second oblique surface and the second surface define the opening of the channel, and wherein the second surface is oriented perpendicular to the support surface.

13. The banding system of claim 11, wherein the second oblique surface is configured to block a portion of material from the crop package moving past the apex toward the third surface, and wherein the banding element is configured to slide along the first oblique surface past the apex toward the opening.

14. The banding system of claim 11, wherein the channel defines a longitudinal axis, and wherein the banding element is configured to extend within the channel along the longitudinal axis, and wherein the banding element defines a width greater than a height, and wherein the width and the height are oriented perpendicular to the longitudinal axis, and wherein a width of the channel defined between the apex and the second surface is greater than the height of the banding element and less than the width of the banding element.

15. The banding system of claim 10, wherein the support member includes a plurality of spaced channels with each channel of the plurality of channels defined by an opening in the support surface, and wherein each channel of the plurality of channels is further defined by a first surface opposite a second surface and a third surface extending between the first and second surfaces, and wherein a distance between the first and second surfaces of each channel of the plurality of channels varies between the opening and the third surface of each channel of the plurality of channels, and wherein the banding system further comprises a plurality of bander units each associated with one channel of the plurality of channels.

16. The banding system of claim 10, wherein the support member is configured to support a cuboid-shaped crop package, and wherein the bander unit is configured to band the cuboid-shaped crop package.

17. A banding system for an agricultural baler, the banding system configured to move a banding element around a crop package to band the crop package, the banding system comprising:
  a support member including a support surface configured to support the crop package, the support member including a channel defined by an opening in the support surface, the channel further defined by a first surface opposite a second surface and a third surface extending between the first and second surfaces, the first surface including a first oblique surface relative to the support surface, a second oblique surface relative to the support surface, and an apex between the first and second oblique surfaces, the second oblique surface and the second surface defining the opening of the channel, the apex positioned away from the opening; and
  a bander unit configured to move the banding element within the channel to band the crop package.

18. The banding system of claim 17, wherein the first and second oblique surfaces are first and second linear oblique surfaces, and wherein the second surface is oriented perpendicular to the support surface.

19. The banding system of claim 17, wherein a distance between the first oblique surface and the second surface decreases in a direction toward the apex, and wherein a distance between the second oblique surface and the second surface increases in the direction from the apex to the opening.

20. The banding element of claim 17, wherein the first oblique surface includes a length greater than a length of the second oblique surface.

* * * * *